F. SCHNEIDER.
APPARATUS FOR CLEARING AND FILTERING WASTE WATER.
APPLICATION FILED MAR. 25, 1910.

992,811.

Patented May 23, 1911.

WITNESSES

INVENTOR
Franz Schneider
BY
ATTORNEY

UNITED STATES PATENT OFFICE.

FRANZ SCHNEIDER, OF SCHWARZENBERG, GERMANY.

APPARATUS FOR CLEARING AND FILTERING WASTE WATER.

992,811. Specification of Letters Patent. Patented May 23, 1911.

Application filed March 25, 1910. Serial No. 551,510.

*To all whom it may concern:*

Be it known that I, FRANZ SCHNEIDER, a subject of the King of Saxony, residing at Schwarzenberg, in the Kingdom of Saxony and German Empire, have invented a new and useful Improved Apparatus for Clearing and Filtering Waste Water, of which the following is a specification.

My invention relates to apparatus for clearing and filtering waste water, adapted for use in paper mills and the like.

The apparatus heretofore used for the purpose have been of great service in the manufacture of paper, but they have certain drawbacks, which have of late given occasion for the introduction of other kinds of apparatus. These drawbacks consist in insufficient purification of the waste water, insufficient store space for the water purified, the necessity of using a pump for raising the purified water, and the formation of froth or foam.

My invention has for object to overcome these drawbacks and it consists, in improvements of the waste water supply pipe, as well as of the clearing and filtering apparatus, and, in the high construction of the latter.

Figure 2:
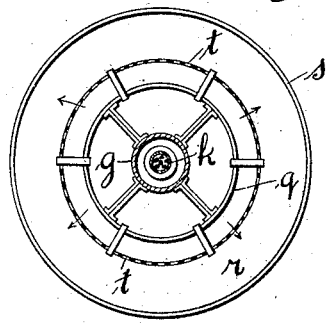
Figure 3:
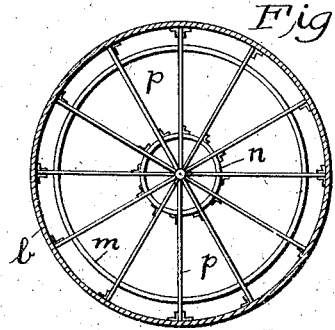
Figure 1:
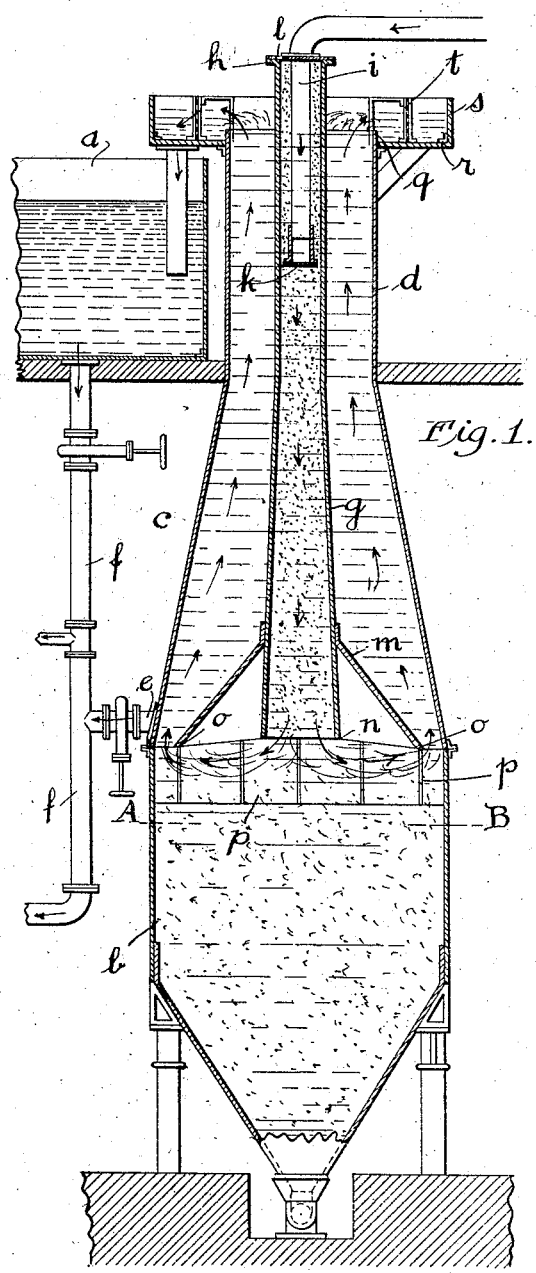

In the accompanying drawing: Figure 1 shows a vertical section of the apparatus, Fig. 2, a plan showing the strainer, Fig. 3, a section on the line A—B in Fig. 1, and Fig. 4, a vertical part section showing another construction of the separator.

My new apparatus reaches from the ground up to a height in excess of that at which the fresh water cistern $a$ is arranged and it comprises, in addition to the deposit tank $b$, a water tank $c$, $d$ provided immediately above, and having one and a half to twice the height of, said deposit tank. The tank $c$, $d$ can, therefore, contain a large quantity of water, which, under normal conditions, is conducted into the tank $a$, but, in the case of a disturbance, can be conducted directly through the pipe $e$ to the main $f$. The central tube $g$ is provided with a lid $h$ at the top, through which passes the pipe $i$ extending into the water in said tube $g$. At the bottom end of said pipe $i$ is provided a perforated plate $k$, in order, to lead in the waste water without its coming into contact with the air, and to prevent the formation of foam. In the lid $h$ there is a small hole $l$ to enable the air entering with the waste water to escape. To the central tube $g$ is attached, instead of the funnel shaped separator used in existing apparatus, a distributing screen $m$, $n$, by which the waste water issuing at the bottom of the pipe $g$ is caused to change its direction and is distributed over a larger area, so that its velocity is decreased, until it reaches the edge $o$ of the funnel, the matter contained therein being thus caused to sink, while the water rises in the tank $c$, $d$.

In order to obtain a uniform distribution of the waste water, and to better assure that the matter contained therein is deposited, distributing blades $p$ are provided immediately under the screen $m$, $n$, said blades extending radially from the bottom end of the tube $g$ to the wall of the tank $b$.

Figure 4:
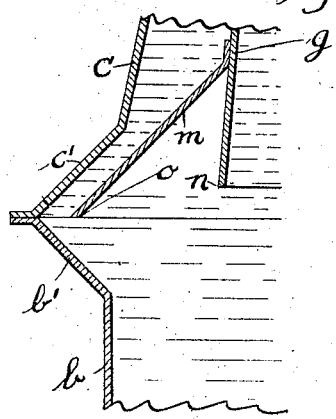

In order to obtain a larger diameter and better action of the screen $m$ without having to make the tanks $b$, $c$, $d$ too large, the tank $b$ may be locally widened as shown at $b^1$, $c^1$ in Fig. 4. The water rising in the tanks $c$, $d$ still contains minute and floating impurities, such as pieces of wood, fibers, alga, etc. In order to retain these there is provided around the overflow edge $q$ of the tank $d$ a filter consisting of an annular vessel $r$, $s$, in which are provided sieves $t$ or the like (Fig. 1), which can be exchanged. The water must pass through these sieves before leaving the apparatus and it flows therefore perfectly pure into the cistern $a$.

What I claim and desire to secure by Letters Patent of the United States is:—

1. In apparatus for clearing and filtering water, in combination, a reservoir for the filtered water, a compartment for the water to be filtered extending below said reservoir, a deposit tank underneath of said compartment, a central tube extending from above into the compartment, a lid closing said tube at the top, an air hole in said lid, a feed pipe within said central tube, a perforated plate closing the bottom end of said feed pipe, a distributing screen at the lower end of the central tube, adapted to change the direction of the waste water, distributing blades below said screen extending radially from the bottom end of said tube to the wall of the deposit tank, and exchangeable means to subject said water to a filtering process.

2. In apparatus for clearing and filtering water, in combination, a reservoir for the filtered water, a compartment for the water to be filtered extending below said reservoir, a deposit tank underneath of said compartment, a central tube extending from above into the compartment, a lid closing said tube at the top, an air hole in said lid, a feed pipe within said central tube, a perforated plate closing the bottom end of said feed pipe, a distributing screen at the lower end of the central tube, adapted to change the direction of the waste water, distributing blades below said screen extending radially from the bottom end of said tube to the wall of the deposit tank, an annular vessel provided with exchangeable sieves at the top end of the apparatus above the reservoir for the filtered water, and means to connect said compartment directly with the main pipe of a water conduit.

In testimony whereof I have signed my name to this specification in the presence of two subscribing witnesses.

FRANZ SCHNEIDER.

Witnesses:
ROBERT AMES NORTON,
WM. WASHINGTON BRUNSWICK.